US012752678B2

(12) United States Patent
Krüger et al.

(10) Patent No.: US 12,752,678 B2
(45) Date of Patent: Oct. 6, 2026

(54) ADJUSTMENT DEVICE COMPRISING AN ASYMMETRICALLY ACTING BRAKE ASSEMBLY AND VEHICLE SEAT HAVING SUCH AN ADJUSTMENT DEVICE

(71) Applicant: Brose Fahrzeugteile SE & Co. Kommanditgesellschaft, Coburg, Coburg (DE)

(72) Inventors: Frieder Krüger, Coburg (DE); Markus Welsch, Lichtenfels (DE); Stefan Steiner, Neustadt bei Coburg (DE); Armin Schafhauser, Bad Rodach (DE)

(73) Assignee: BROSE FAHRZEUGTEILE SE & CO. KOMMANDITGESELLSCHAFT, COBURG, Coburg (DE)

( * ) Notice: Subject to any disclaimer, the term of this patent is extended or adjusted under 35 U.S.C. 154(b) by 286 days.

(21) Appl. No.: 18/546,589

(22) PCT Filed: Feb. 17, 2022

(86) PCT No.: PCT/EP2022/053862
§ 371 (c)(1),
(2) Date: Aug. 15, 2023

(87) PCT Pub. No.: WO2022/175352
PCT Pub. Date: Aug. 25, 2022

(65) Prior Publication Data

US 2024/0131967 A1 Apr. 25, 2024
US 2024/0227634 A9 Jul. 11, 2024

(30) Foreign Application Priority Data

Feb. 18, 2021 (DE) ..................... 10 2021 201 575.1

(51) Int. Cl.
*B60N 2/90* (2018.01)
*B60N 2/16* (2006.01)

(52) U.S. Cl.
CPC ............. *B60N 2/168* (2013.01); *B60N 2/165* (2013.01); *B60N 2/938* (2018.02)

(58) Field of Classification Search
CPC ....... B60N 2/168; B60N 2/1889; B60N 2/938
See application file for complete search history.

(56) References Cited

U.S. PATENT DOCUMENTS 1,575,426 A 3/1926 Harry
3,051,282 A 8/1962 Greene
(Continued)

FOREIGN PATENT DOCUMENTS

CN 101875321 A 11/2010
CN 202480915 U 10/2012
(Continued)

OTHER PUBLICATIONS

ISA European Patent Office, International Search Report Issued in Application No. PCT/EP2022/053862, May 9, 2022, WIPO, 4 pages.
(Continued)

*Primary Examiner* — Timothy J Brindley
(74) *Attorney, Agent, or Firm* — McCoy Russell LLP

(57) ABSTRACT

It is provided an adjustment device for a vehicle seat, comprising an output element to which a drive torque can be transferred, and a brake assembly for locking the output element and absorbing, via at least two brake elements adjustably mounted in a brake housing of the brake assembly, forces applied to the output element on the output side, wherein locking, provided via the brake assembly, of the output element can be released in order to rotate the output element in a direction of rotation when a drive torque is
(Continued)

applied on the drive side, and, in order to lock the output element, the brake elements are in a locking position in which, when forces are applied on the output side via the output element and are acting in a direction of rotation, at least one of the brake elements bears frictionally against a brake surface of the brake housing.

15 Claims, 6 Drawing Sheets

(56) References Cited

U.S. PATENT DOCUMENTS

| | | | | |
|---|---|---|---|---|
| 6,675,945 | B2 | 1/2004 | Kim | |
| 8,376,115 | B2 | 2/2013 | Cai et al. | |
| 9,884,571 | B2 | 2/2018 | Akutsu et al. | |
| 9,884,572 | B2 | 2/2018 | Kaku | |
| 10,059,235 | B2 * | 8/2018 | Piaulet | B60N 2/2245 |
| 10,369,912 | B2 * | 8/2019 | Asai | G05G 5/24 |
| 10,428,882 | B2 * | 10/2019 | Kaku | B60N 2/165 |
| 11,312,266 | B2 * | 4/2022 | Zhang | B60N 2/02246 |
| 11,708,012 | B2 * | 7/2023 | Mikasa | B60N 2/1615 297/344.12 |
| 2012/0242133 | A1 | 9/2012 | Jaudouin et al. | |
| 2016/0039637 | A1 | 2/2016 | Momoki | |
| 2018/0094679 | A1 | 4/2018 | Kaku | |

FOREIGN PATENT DOCUMENTS

| | | | | |
|---|---|---|---|---|
| CN | 105121892 | A | 12/2015 | |
| CN | 105190079 | A | 12/2015 | |
| DE | 19912789 | A1 | 9/2000 | |
| DE | 10004855 | A1 * | 8/2001 | B60N 2/938 |
| DE | 10014823 | C1 | 8/2001 | |
| DE | 10052234 | A1 | 5/2002 | |
| DE | 102008052892 | A1 | 10/2009 | |
| EP | 2860422 | A1 | 4/2015 | |
| EP | 3330123 | B1 | 9/2020 | |
| EP | 3626516 | B1 | 4/2021 | |
| EP | 3626515 | B1 | 8/2021 | |
| FR | 2956077 | B1 | 2/2012 | |
| JP | 2002301956 | A | 10/2002 | |
| JP | 2013253661 | A | 12/2013 | |
| JP | 2014031090 | A | 2/2014 | |
| JP | 2017026140 | A | 2/2017 | |
| JP | 6093215 | B2 | 3/2017 | |
| JP | 6109613 | B2 | 4/2017 | |
| JP | 6483174 | B2 | 3/2019 | |
| JP | 2019183926 | A | 10/2019 | |
| JP | 6627806 | B2 | 1/2020 | |
| KR | 101117796 | B1 * | 3/2012 | |
| KR | 20180107722 | A | 10/2018 | |
| WO | 2014021299 | A1 | 2/2014 | |
| WO | WO-2014104599 | A1 * | 7/2014 | B60N 2/168 |
| WO | 2018025905 | A1 | 2/2018 | |

OTHER PUBLICATIONS

China National Intellectual Property Administration, Office Action and Search Report Issued in Application No. 202280015012.4, Nov. 18, 2025, 13 pages. (Submitted with Partial Translation).

Korean Intellectual Property Office, Office Action Issued in Application No. 10-2023-7031275, May 7, 2026, 10 pages. (Submitted with English Translation).

* cited by examiner

ADJUSTMENT DEVICE COMPRISING AN ASYMMETRICALLY ACTING BRAKE ASSEMBLY AND VEHICLE SEAT HAVING SUCH AN ADJUSTMENT DEVICE

CROSS REFERENCE TO RELATED APPLICATIONS

The present application is a U.S. National Phase of International Application No. PCT/EP2022/053862 entitled "ADJUSTMENT DEVICE COMPRISING AN ASYMMETRICALLY ACTING BRAKE ASSEMBLY, AND VEHICLE SEAT HAVING SUCH AN ADJUSTMENT DEVICE," and filed on Feb. 17, 2022. International Application No. PCT/EP2022/053862 claims priority to German Patent Application No. 10 2021 201 575.1 filed on Feb. 18, 2021. The entire contents of each of the above-listed applications are hereby incorporated by reference for all purposes.

BACKGROUND

The proposed solution relates to an adjustment device for a vehicle seat.

A generic adjustment device comprises, in particular, an output element, a drive assembly for introducing a drive torque to be transferred to the output element, and a brake assembly for locking the output element and absorbing, via at least two brake elements adjustably mounted in a brake housing of the brake assembly, forces applied to the output element on the output side. If a drive torque is introduced on the drive side via the drive assembly, the locking via the brake assembly shall be released and the output element shall be rotatable. If no drive torque is present on the drive side, it is ensured via the brake assembly that no undesired adjustment of the output element can occur. For this purpose, the brake elements of the brake assembly bear frictionally against a brake surface of the brake housing and apply a braking force and, along with it, a braking torque, which counteracts an adjustment of the output element when force is introduced on the output side. Such adjustment devices are provided, for example, on a vehicle seat for seat height adjustment. A locking that is secure in the event of a collision is then provided via the brake assembly, so that a set seat height cannot change without application of a drive torque and therefore without a deliberate seat height adjustment initiated by a user.

In adjustment devices previously common in practice, a symmetrical design is regularly provided, so that, regardless of a direction of rotation along which a force introduced on the output side acts on the output element, a maximum braking torque of uniform magnitude is provided via the brake assembly. Loads introduced on the output side can thus be absorbed in the same magnitude, regardless of the direction of action. Such an adjustment device is also known, for example, from U.S. Pat. No. 9,884,571 B2. In an adjustment device known from U.S. Pat. No. 9,884,571 B2, it is also provided that, when a drive torque is introduced on the drive side, the adjustment force is also transferred to the output element via the brake elements.

Due to a symmetrical design of a brake assembly, its elements are regularly oversized for one load direction and thus are not configured to be cost- and resource-efficient. For example, in proper operation of the adjustment device, significantly lower loads typically occur along a load direction and thus along a direction of rotation of the output element with forces introduced on the output side than in an opposite load direction. For example, in the event of a collision, increased forces act on the output element on the output side, especially along exactly one load direction.

DE 100 14 823 C1 describes a device for adjusting the position of a portion of a motor vehicle seat.

SUMMARY

There is thus a need for an improved adjustment device and an improved vehicle seat of the type mentioned at the outset.

In this respect, an adjustment device as described herein and a vehicle seat of as described herein provide a remedy.

A proposed adjustment device provides here, in addition to a drive assembly, a brake assembly via which a maximum braking torque counteracting an adjustment of the output element is provided, which braking torque varies in magnitude according to the direction of rotation along which a force acting on the output element on the output side acts.

The proposed solution thus starts from the basic idea of providing, via the brake assembly and the adjustably mounted brake elements provided herein, a braking force which varies depending on whether a resulting force applied to the output element on the output side in one direction of rotation or the other, opposite direction of rotation. This results in a maximum braking torque that varies depending on the direction of rotation along which a force acting on the output element on the output side acts. Thus, the brake assembly is configured to lock the output element against rotation in each of the two possible directions of rotation. However, a higher braking force is provided in one direction of rotation than in the other. In this way, manufacturing costs and material costs can be reduced by dimensioning the brake assembly for a lower load, at least with regard to one load case. The brake assembly is thus configured asymmetrically in order to be able to effectively absorb the different loads depending on the load direction in a small installation space.

If the brake elements of the brake assembly are in their respective locking position and thus lock the output element against rotation, the brake elements can be in contact not only with a brake surface of the brake housing, but also with the output element itself, in order to thus transfer the forces acting on the output element via at least one of the brake elements into the brake housing. The frictional contact with a brake surface of the brake housing means that the locking mechanism can still be easily released in the case of adjustable brake elements mounted inside the brake housing, if a drive torque is introduced via the drive assembly as intended (on the drive side) and is to be transferred to the output element. In this context, one variant of the proposed solution provides that no drive torque introduced on the drive side can be transferred to the output element via the brake elements of the brake assembly. After a released locking, only the output element is not locked by the brake elements against an adjustment movement due to the drive torque introduced on the drive side. In such a variant the brake elements are thus only provided for locking the output element. In such a variant, there is thus a deliberate functional separation between elements for transferring the drive torque from the drive assembly to the output element and elements for locking the output element when the drive torque is not applied.

For example, first and second maximum braking torques of different magnitudes are provided by the brake assembly to counteract adjustment of the output element, depending on the direction of rotation in which a resultant force applied to the output element on the output side acts. A first maximum braking torque provided via the brake assembly and counteracting a rotation of the output element along a first direction of rotation (due to a force applied to the output element on the output side) is then smaller than a second maximum braking torque provided via the brake assembly counteracting a rotation of the output element along an opposite, second direction of rotation (due to a force applied to the output element on the output side and acting in the opposite direction).

The different braking torques are realized, for example, via different numbers of brake elements and/or different numbers of brake portions of the brake elements, which bear frictionally against the brake surface (and thus lock the output element) in a locking position. For example, for the direction of rotation for which a higher counteracting maximum braking torque is to be provided, more brake elements and/or more brake portions are provided that bear frictionally against the brake surface in the respective locking position than for an opposite direction of rotation.

In one variant, at least three, in particular exactly three, brake elements are provided, each of which has at least one brake portion for frictional contact with the brake surface of the brake housing. With at least three brake elements, for example, two brake elements can be provided for locking the output element in one direction of rotation and one brake element for locking in the opposite direction of rotation. Depending on the direction of action of the forces introduced on the output side, a different number of brake elements are thus active to hold the output element in position and lock it against rotation. This includes, for example, a variant in which a first group of brake elements is provided, the brake portions of which bear frictionally against the brake surface when forces act on the output element on the output side to rotate the output element along a first direction of rotation. In the event that forces act on the output element on the output side to rotate the output element along an opposite, second direction of rotation, a second group of brake elements is then provided, the brake portions of which bear frictionally against the brake surface, wherein this second group comprises at least one more brake element and/or at least one more brake portion than the first group. In this way, a higher braking force and thus a higher maximum braking torque can be provided via the second group of brake elements. The brake elements of the different first and second groups are thus assigned to different directions of action of a braking force to be applied in each case and are thus provided for, or are "responsible" for, locking the output element in different load directions. The second group with at least one more brake element and/or at least one more brake portion (and thus a larger area for frictional contact with the brake surface of the brake housing) is thus effectively configured, for example, for loads occurring along a main load direction, while the first group is configured for a load in a secondary load direction.

For example, in one variant, in a main load direction a maximum braking torque is provided that is more than 30% higher, in particular more than 50% higher, than a maximum braking torque in a secondary load direction. For example, a maximum braking torque in the main load direction is greater than 140 Nm, in particular greater than 160 Nm or 180 Nm. In one variant, a maximum braking torque in the main load direction is, for example, in the range of 180 Nm to 210 Nm, in particular 200 Nm. By contrast, a maximum braking torque in the secondary load direction is, for example, less than 160 Nm, in particular less than 140 Nm or 120 Nm. In one variant, a maximum braking torque in the secondary load direction is, for example, in the range of 90 Nm to 110 Nm, in particular 100 Nm.

For a compact design of the adjustment device, both the brake elements of the first group and the brake elements of the second group can be displaced from a respective locking position into a release position via a driver element of the brake assembly that can be driven by the drive assembly, in order to release the locking of the output element provided via the brake assembly when a drive torque is introduced via the drive assembly. Thus, a locking of the first group and also of the second group of brake elements can be released via the one driver element. For example, the driver element can act on different brake elements depending on the direction of rotation of the applied drive torque.

For example, the driver element comprises a plurality of driver portions for this purpose, each of which is assigned to at least one brake element for releasing the respective locking mechanism provided via this. The plurality of driver portions can be arranged distributed along a circumferential direction around an axis of rotation of the output element, in particular evenly distributed over the circumference.

A driver portion can, for example, each be brought into contact with a contact portion of the assigned brake element when a drive torque is introduced, for the displacement of an assigned brake element into the respective release position. A driver portion of the driver element can thus act on an assigned contact portion of the brake element in order to displace the brake element into the respective release position. An adjustment force to be transferred from the driver element to the brake element in this case can result partly from the drive torque. Part of the drive torque is thus used to release the locking via the brake assembly.

For example, the driver element is rotatable about an axis of rotation and a driver portion for a particular brake element of the first group can only be brought into contact with a contact portion lying in a first drive direction of rotation, while a driver portion for another brake element of the second group can only be brought into contact with a contact portion lying in an opposite, second drive direction of rotation. The axis of rotation of the driver element can coincide here fundamentally with an axis of rotation of the output element.

In a variant based on this, for example, a (axially protruding) driver portion of the driver element then engages in a recess of a respective assigned brake element, wherein a distance to the respective contact portion lying in the first or second drive direction of rotation is then less than a distance to a circumferentially opposite portion of the brake element. In this way, the driver portion cannot come into contact with the opposite portion when the driver element is rotated in the respective second or first drive direction of rotation in which no locking is provided via that brake element. For example, in each case a driver portion has then already come into contact with a contact portion of a brake element of the respective other group, which has a smaller distance to the assigned driver portion in this drive direction of rotation. Since the brake element of the other group does not counteract a rotation of the output element in the respective drive direction of rotation and consequently also has no locking contact with the brake surface of the brake housing, such a brake element does not have to be displaced into a release position via the driver element, but is simply rotated along with it.

In one variant, the brake elements of the brake assembly are tiltably mounted within the brake housing between a respective locking position and a release position, in which a locking of the output element is released via the respective brake element. Consequently, depending on the direction of rotation in which a drive torque introduced on the drive side acts, the brake elements can be displaced from a respective locking position by tilting into a release position in which there is no longer any locking, frictional contact with the brake surface of the brake housing. For example, the brake elements can each be tilted here about a tilt axis running parallel to a rotation axis of the output element. Each brake element is then mounted in the brake housing such that it can tilt about one of several tilt axes (one tilt axis per brake element). In this case, the brake elements can be preloaded via at least one spring element in the direction of the respective tilted locking position. When the drive torque is not applied, the brake elements, which may initially be in a release position, are thus automatically displaced into their respective locking position under the action of the at least one spring element in order to lock the output element.

In particular in such a variant, the brake elements of the brake assembly can be configured as brake segments and thus in the manner of brake shoes. An outer contour of such a brake segment can be circumscribed by the contour of a circle segment in a viewing direction in an axis of rotation of the output element, and thus can be framed thereby.

In particular, in such a configuration, the brake elements of the brake assembly can bear against an assigned contact surface of the output element in their respective locking positions via a convexly curved contact portion. The convexly curved contact portion is then provided radially on the inside of a brake element, for example, in relation to an axis of rotation about which the output element can be rotated when a drive torque is introduced on the drive side. By contrast, a brake portion to be brought into frictional contact with the brake surface of the brake housing is provided radially on the outside of the brake element. The convex curvature of the contact portion can be particularly advantageous here for guided tilting of the respective brake element with at least partial rolling of the contact portion on the contact surface of the output element.

For example, the brake assembly comprises exactly three brake elements. In such a configuration, the output element can then have a coupling portion with a hexagonal cross-section and three separate contact surfaces for the three brake elements. Each contact surface of the output element is thus assigned to exactly one brake element, via which the output element can be locked. Via its contact surfaces, the output element can then introduce a force introduced on the output side into the respective brake element and thus into the brake housing.

In another variant, a driver element for releasing the locking of the brake assembly comprises at least one driver portion that can be brought into contact with two different brake elements depending on the direction of action of the introduced drive torque. Accordingly, in the case of a drive torque acting in a first direction of action, the driver portion can be brought into contact with one brake element in order to displace this one brake element into a release position. With a drive torque acting in an opposite, second direction of action, the same driver portion can be brought into contact with another (circumferentially opposite) brake element in order to displace the other brake element into a release position. One driver portion of the driver element is thus provided here for acting on two different brake elements of the brake assembly depending on a direction of action of an applied drive torque.

In a possible development, at least one additional driver portion of the driver element is assigned to exactly one brake element in order to displace this brake element into a release position only in the event of a drive torque acting in one of the two possible directions of action. The additional driver portion thus cannot act on a brake element in the opposite direction of rotation.

In particular, in such a variant, the brake elements can be configured as rotationally symmetrical clamping bodies. The brake elements are thus each configured as rotational bodies, e.g. as rollers or balls, which can rest against the brake surface of the brake housing in a clamping manner in their respective locking positions. For example, the rotational bodies are accommodated in a gap between the brake surface of the brake housing and a) a coupling portion of the output element or b) a coupling element connected to the output element for conjoint rotation. Depending on the direction of rotation of the forces acting on the output side, the rotational bodies are then clamped in the gap in the manner of a clamping roller freewheel in order to lock the output element against the brake surface of the brake housing.

In particular, irrespective of the design of the brake elements as brake segments or rotationally symmetrical clamping bodies, the brake assembly may, in one variant, comprise at least two spring elements, via which brake elements of the brake assembly are preloaded against each other, wherein the spring forces acting on the brake elements and applied by the spring elements are of different magnitudes. For example, a resulting spring force on the brake elements may differ depending on the type of spring elements, the arrangement of the spring elements and/or their spring constants in order to preload the brake elements differently. By using spring elements with different resulting spring forces on the brake elements (e.g. spring elements with different spring constants and thus in particular by using springs with different strengths), the different braking forces depending on the direction of action and thus the different maximum braking torques depending on the direction of action which are to be provided via the brake assembly can be set in a targeted way. The use of different spring elements here has the advantage that these lead to different natural frequencies at which a locking is at least partially released under certain circumstances. In particular, a spring preload applied to the brake elements determines a natural oscillation behavior of the brake elements. A brake element on which one spring element is supported can thus act better in a different frequency band than another brake element on which a spring element with a different spring constant is supported.

Depending on the configuration of the brake assembly and in particular the design of the brake elements, the at least two spring elements, which have different spring constants, can preload different brake segments against each other.

In a first variant, for example, a first brake element and a second brake element of at least three brake elements of the brake assembly are preloaded against each other via a first spring element with a first spring constant, while a second spring element with a higher, second spring constant preloads a third brake element and the first brake element against each other. Such a configuration can be used, for example, with tiltably mounted brake segments. With exactly three brake segments, for example, exactly two spring elements are then provided, for example in the form of compression springs, which have different spring constants and are thus of different strengths.

In a second variant, a first brake element and a second brake element of the brake assembly are preloaded against each other via a first spring element with a first spring constant, while a second spring element with a higher, second spring constant preloads a third brake element and the second brake element against each other. Such a configuration can be advantageous when the brake elements are configured as rotationally symmetrical clamping bodies, in which three clamping bodies (of a set of clamping bodies) are each preloaded against each other with two springs of different spring constants. In this case, several sets of three clamping bodies each can also be provided distributed circumferentially about an axis of rotation of the output element in order to ensure effective locking of the output element.

For the transfer of the drive torque introduced via the drive assembly into the output element, the adjustment device can comprise a control element which is form-fittingly connected to a) a coupling portion of the output element or b) a coupling element of the adjustment device, which coupling element is connected to the output element in a rotationally fixed manner. Via the control element and its form-fitting connection to the coupling portion or coupling element, the drive torque can be transferred into the output element without the need for a transfer via the (released) brake elements of the brake assembly. For the form-fitting connection, for example, a form-fit opening can be provided in the control element, in which the coupling portion of the output element or the coupling element connected to the output element for conjoint rotation engages form-fittingly. For example, the control element is configured as a control disc with a central form-fit opening.

A control element provided for transferring the drive torque can also be connected in a rotationally fixed manner to a driver element via which the locking can be released via the brake elements of the brake assembly. When the control element is rotated to transfer an introduced drive torque to the output element, the driver element is consequently rotated together with the control element. This causes the driver element to act on the brake assembly to release the locking of the output element.

A proposed adjustment device can, for example, be provided and configured to transfer a manually initiated force to a seat height adjustment mechanism of a vehicle seat. The drive torque transferred to the output element of the adjustment device can then be used to adjust the height of a vehicle seat, i.e. to lower or raise it. The direction of action of the drive torque is decisive here for whether the vehicle seat is to be raised (first direction of action of the drive torque) or lowered (second, opposite direction of action of the drive torque).

Accordingly, the proposed solution also provides a vehicle seat comprising a variant of a proposed adjustment device for a seat height adjustment.

BRIEF DESCRIPTION OF THE DRAWINGS

The attached figures illustrate exemplary possible variants of the proposed solution.

DETAILED DESCRIPTION

Figure 1:
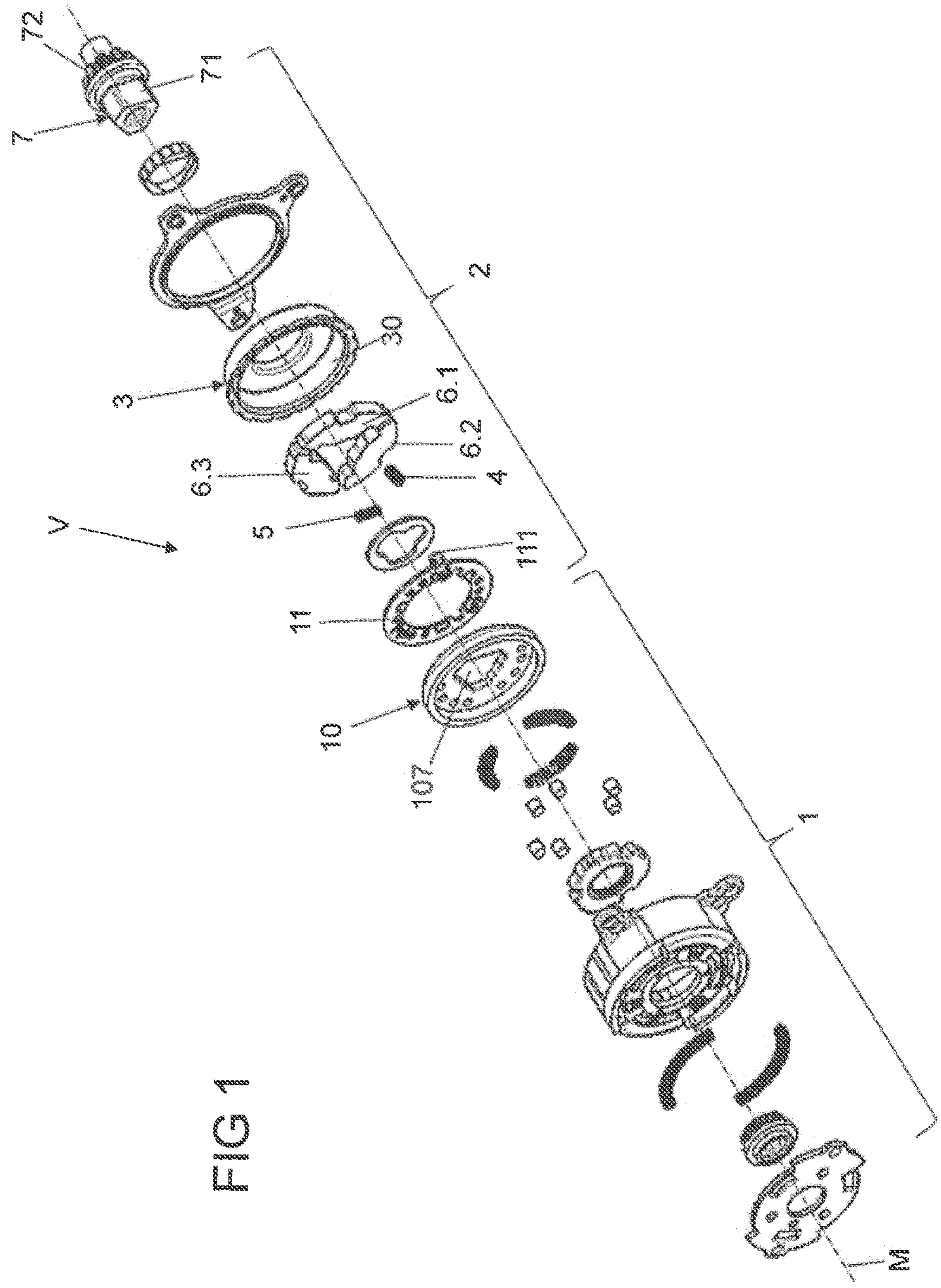
FIG. 1 shows an exploded view of a first variant of a proposed adjustment device.

FIG. 1 shows an exploded view of a first exemplary embodiment of a proposed adjustment device V with a drive assembly 1 and a brake assembly 2, wherein the brake assembly 2 is configured as an asymmetrically acting shoe brake with several—in the present case a total of three—brake elements in the form of brake segments 6.1, 6.2 and 6.3. The adjustment device V of FIG. 1 is provided for manual seat height adjustment on a vehicle seat. The adjustment direction V here permits the introduction of a drive torque via the drive assembly 1 and the transfer of this drive torque to an output element in the form of an (output) pinion 7. The pinion 7 is rotatably mounted about a central axis of rotation M of the adjustment device V and is form-fittingly received in a pinion opening 107 of a control disc 10 of the drive assembly 1 via a coupling portion 71. In this way, a drive torque can be transferred from the control disc 10 to the pinion 7.

The drive torque can then be transferred to a seat structure of the vehicle seat via an output portion 72 of the pinion 7. For this purpose, for example, a toothing of the output portion 72 can engage in a toothed segment of the vehicle seat for the seat height adjustment. Depending on the direction of rotation in which the drive torque acts on the drive assembly 1, the pinion 7 is rotated in one or the other direction of rotation about the central axis of rotation M and thus, for example, clockwise or counter-clockwise. For example, a roller freewheel drive or a pawl drive can be provided for introducing the drive torque. However, other configurations are of course also possible.

The brake assembly 2 of the device V is provided to prevent the pinion 7 from being unintentionally displaced when the seat height is assumed. Via the brake assembly 2, the pinion 7 is locked in an assumed adjustment position when the drive torque is not applied. This locking serves in particular also for the collision-proof locking of an adjustment mechanism provided for the seat height adjustment in order to prevent the set seat height of the vehicle seat from changing due to the loads occurring in the event of a collision. Via the brake assembly 2, the pinion 7 is locked against rotation when forces are applied to the pinion 7 on the output side. If, for example, the output portion 72 receives a torque from the seat structure via a toothed segment engaging in the teeth of the output portion, this torque is absorbed via the brake assembly 2. The brake segments 6.1, 6.2 and 6.3 of the brake assembly 2 (as well as the brake rollers 6.1', 6.2' and 6.3' of the variant yet to be explained below) consequently apply a braking force counteracting the rotation of the pinion 7 in order to block the pinion 7 against rotation in the event of resultant forces acting on the output side.

For the locking of the pinion 7, the brake segments 6.1, 6.2 and 6.3 can each bear frictionally against a radially inner circumferential brake surface 30 of a brake housing 3, in which the brake segments 6.1, 6.2 and 6.3 are adjustably mounted. The three brake segments 6.1, 6.2 and 6.3 are arranged here around the central axis of rotation M of the adjustment direction V and are in contact with the coupling portion 71 of the pinion 7 via radially inner contact portions 6.11, 6.21 and 6.31 of a brake segment 6.1, 6.2 or 6.3 (compare also FIG. 2B). The brake segments 6.1, 6.2 and 6.3 are preloaded here against each other in the circumferential direction via compression springs 4 and 5 of different strengths in order to provide maximum braking torques of different magnitudes in the present case depending on the direction of rotation in which a resultant force applied to the output side of the pinion 7 acts. Thus, in one direction of rotation two brake segments 6.1 and 6.2 are active, while in the other direction of rotation only the other brake segment 6.3 is active, as will be explained in greater detail below.

In order to release the locking of the pinion 7 via the brake segments 6.1, 6.2 and 6.3 when a drive torque is applied, the control disc 10 is connected to a driver disc 11 for conjoint rotation. This driver disc 11 has a plurality of axially protruding driver projections 111, 112 and 113, which can act on the brake segments 6.1, 6.2 and 6.3 when the driver disc 11 rotates about the axis of rotation M, in order to displace them from their respective locking positions and thus release the pinion 7.

Figure 2A:
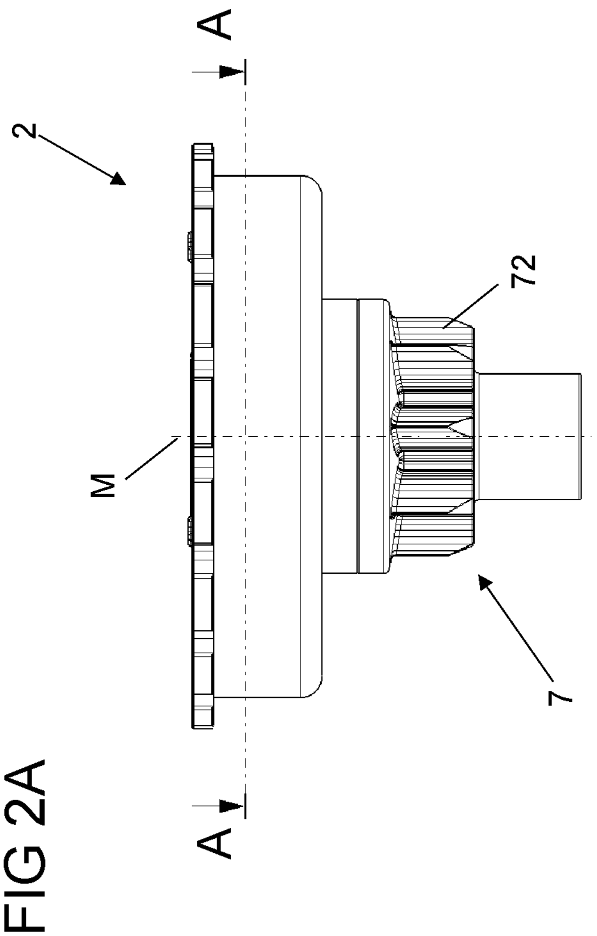
FIG. 2A shows, in a side view of a brake assembly, the adjustment device from FIG. 1.

The brake assembly 2 is shown in side view in FIG. 2A. This shows in particular that the pinion 7 with its output portion 72 and in particular the toothing formed on it protrudes axially from the brake housing 3 along the central center axis or axis of rotation M of the adjustment device V.

Figure 2B:
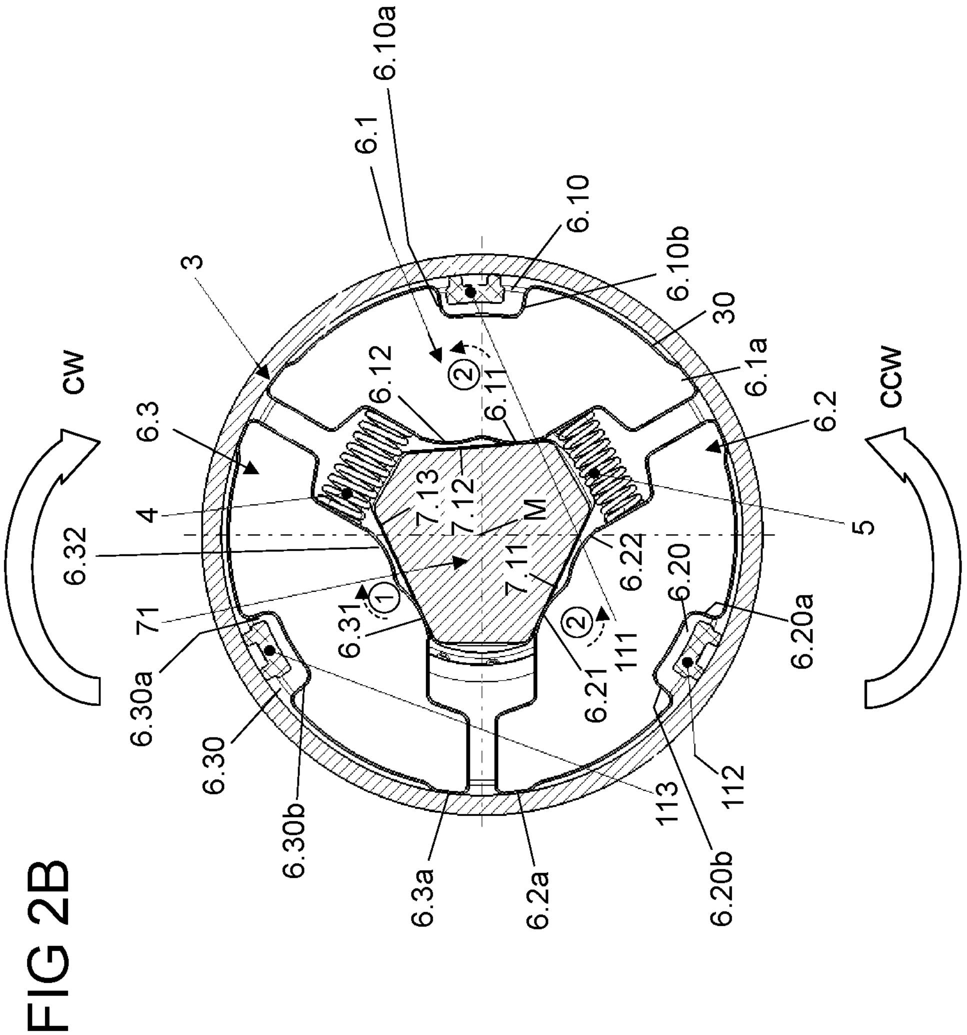
FIG. 2B shows a sectional view along the line of section A-A from FIG. 2A showing three brake segments of the brake assembly, each of which is tiltably mounted and preloaded against each other by two compression springs with different spring constants.

FIG. 2B shows a sectional view through the brake assembly 2 along the line of section A-A of FIG. 2A. It is particularly evident from FIG. 2B that each brake segment 6.1, 6.2 and 6.3 has, in each case, a convex, radially inwardly curved contact portion 6.11, 6.21 or 6.31 with respect to the axis of rotation M, via which the respective brake segment 6.1, 6.2 or 6.3 bears against an assigned contact surface 7.11, 7.12 or 7.13 of the coupling portion 71 of the pinion 7. By contrast, an adjacent secondary portion 6.12, 6.22 or 6.32 of a brake segment 6.1, 6.2 or 6.3, which is also convexly curved, is slightly spaced radially from the assigned contact surface 7.11, 7.12 or 7.13 of the coupling portion 71. Each brake segment 6.1, 6.2 and 6.3 is thus mounted within the brake housing 3 such that it can tilt about a tilt axis which runs parallel to the axis of rotation M but is located radially further outwards. From a locking position of a brake segment 6.1, 6.2 or 6.3 shown in FIG. 2B, the respective brake segment 6.1, 6.2 or 6.3 can be tilted here into a release position by rolling the respective contact portion 6.11, 6.21 or 6.31 on the contact surface 7.11, 7.12 or 7.13 in the direction of the spaced-apart secondary portion 6.12, 6.22 or 6.32, in order to release a locking of the pinion 7 relative to the brake housing 3 by the respective brake segment 6.1, 6.2 or 6.3.

First and second brake segments 6.1 and 6.2 of the brake assembly 2 are in this case preloaded in a first direction of rotation cw (clockwise in FIG. 2B) into their respective tilted locking positions via the spring tension applied by the compression springs 4 and 5, while a third brake segment 6.3 is preloaded in the opposite, second direction of rotation ccw (counter-clockwise) into its locking position. Thus, a compression spring 4 with a higher spring constant is provided between the first brake segment 6.1 and the third brake segment 6.3. A second, weaker compression spring 5 in turn preloads the first and second brake segments 6.1 and 6.2 relative to each other. Due to the higher spring constant of the stronger compression spring 4, the first brake segment 6.1 and the third brake segment 6.3 are consequently preloaded in opposite directions of rotation cw and ccw. The higher preloading force of the compression spring 4 also leads here to a preloading of the second brake segment 6.2 over the weaker compression spring 5 in the same direction of rotation cw as the first brake segment 6.1.

Each brake segment 6.1, 6.2 and 6.3 is accordingly in frictional contact with the brake surface 30 of the brake housing 3 via a radially outer brake portion 6.1*a*, 6.2*a* or 6.3*a*. The respective brake portion 6.1*a*, 6.2*a*, 6.3*a* is in each case closer to the contact portion 6.11, 6.21 or 6.31 of the respective brake segment 6.1, 6.2 or 6.3 which is in contact with the contact surface 7.11, 7.12 or 7.13. If a torque introduced on the output side is thus transferred from the cross-sectionally hexagonal coupling portion 71 of the pinion 7 to an adjacent brake segment 6.1, 6.2 or 6.3, the respective brake segment—depending on the direction of rotation—is frictionally supported on the brake surface 30 via the assigned brake portion 6.1*a*, 6.2*a* or 6.3*a* and hereby blocks the pinion 7 against rotation about the axis of rotation M. Here, in the case of a force introduced on the output side in the first direction of rotation cw, a locking is ensured via the third brake segment 6.3, while in the case of a force applied to the output side in the second direction of rotation ccw, locking of the pinion 7 is ensured via the two first and second brake segments 6.1 and 6.3.

If, for example, a torque is introduced in the first direction of rotation cw from a seat structure by a toothed segment engaging in the teeth of the output portion 72 of the pinion 7, a load is transferred to the one, third brake segment 6.3 via the transmission contour formed with the coupling portion 71. Via the stronger compression spring 4, the third brake segment 6.3 is supported against the adjacent, counter-rotating first brake segment 6.1 and preloaded in the brake housing 3. There is thus a play-free load introduction from the pinion 7 into the third brake segment 6.3 and the load can be absorbed directly by the brake housing 3. Here, the position of a contact point of the third brake segment 6.3 at its contact portion 6.31 to the pinion 7 as well as contact points of the third brake segment 6.3 to the brake housing 3 define the normal forces which exert a self-locking, frictionally engaged blocking effect on the pinion 7 at its coupling portion 71 according to their geometric position. Consequently, if a force is introduced on the output side in the first direction of rotation cw, a force is only introduced into the third brake segment 6.3, but not into the first and second brake segments 6.1 and 6.2.

If, on the other hand, a force acting in the opposite, second direction of rotation ccw is introduced into the pinion 7 on the output side via the brake assembly 2 when the locking is in effect, the associated load is transferred to the first and second brake segments 6.1 and 6.2 via the coupling portion 71 of the pinion 7 and its transfer contour. Here, the first and second brake segments 6.1 and 6.2 are supported against the counter-rotating third brake segment 6.3 via the compression springs 4 and 5 and are preloaded in the brake housing 3. Due to the higher force level of the compression spring 4, which is provided between the first brake segment 6.1 and the third brake segment 6.3, a correct orientation of the positions of the first and second brake segments 6.1 and 6.2 in the brake housing 3 is ensured. This also ensures a play-free load introduction from the pinion 7 into the first and second brake segments 6.1 and 6.2, so that the load can thus be absorbed by the brake housing 3. In addition, a self-locking, frictionally engaged blocking effect on the pinion 7 is also ensured in order to secure the pinion 7 against rotation about the axis of rotation M in the second direction of rotation ccw. Consequently, if a force is introduced on the output side in the second direction of rotation ccw, a force is only introduced into the first and second brake segments 6.1 and 6.2, but not into the third brake segment 6.3.

In the case of the adjustment device V shown and in particular its brake assembly 2, different large maximum braking torques are thus provided via a different number of brake segments or brake portions which interact with the brake surface 30 of the brake housing 3, depending on the direction of rotation cw or ccw along which a resultant force applied to the pinion 7 acts. This makes it possible to take into account in a cost- and resource-efficient manner the fact that, in the cases of application intended for the adjustment direction V, it can typically be assumed that greater forces are to be absorbed in one direction of rotation cw (main load direction) than in the opposite direction of rotation ccw (secondary load direction). The asymmetrically acting brake assembly 2 takes this circumstance into account efficiently, so that an oversizing for absorbing loads along the secondary load direction can be avoided and the device V can thus be configured to be compact and cost-effective.

For example, a maximum braking torque can be provided in a main load direction that is more than 30% higher, in particular more than 50% higher, than a maximum braking torque in a secondary load direction. For example, a maximum braking torque in the main load direction is greater than 140 Nm, in particular greater than 160 Nm or 180 Nm. In a variant, a maximum braking torque in the main load direction is, for example, in the range of 180 Nm to 210 Nm, in particular 200 Nm. By contrast, a maximum braking torque in the secondary load direction is, for example, less than 160 Nm, in particular less than 140 Nm or 120 Nm. In one variant, a maximum braking torque in the secondary load direction is, for example, in the range of 90 Nm to 110 Nm, in particular 100 Nm.

In this context, it is also advantageous that the natural vibration behavior of the components can be well tuned by the compression springs 4 and 5 of different strength. Thus, a natural frequency of the brake segments depends, among other things, on an applied spring preload. In the variant shown, the first brake segment 6.1 can thus act better in a different frequency band than the second brake segment 6.2, and vice versa. Therefore, an asymmetrical shoe brake realized via the brake assembly 2 is also less susceptible to an independent adjustment of the brake segments 6.1 and 6.2 during a frequency excitation.

Although the brake segments 6.1, 6.2 and 6.3 are configured identically in the variant shown, they can also be configured differently. Furthermore, the spring elements 4 and 5 can also be configured differently. Alternatively or additionally, the spring elements 4 and 5 can be exchangeable and replaceable in the shown brake assembly 2. In this way, for example, a brake assembly 2 which is provided for one (left or right) longitudinal side of a vehicle seat and which is configured for a main load direction and secondary load direction decisive for this longitudinal side can be used for an opposite (right or left) longitudinal side of a vehicle seat by simply changing the spring elements 4 and 5. This includes in particular a variant in which a kit is provided via a brake assembly 2 with the brake housing 3 and brake segments 6.1, 6.2 and 6.3 tiltably mounted therein. With such a kit, during assembly of the brake assembly 2 and the assigned adjustment device V, the compression springs 4 and 5 are then inserted at different positioned into the gaps existing between the individual brake segments 6.1, 6.2 and 6.3, depending on the intended use, in order to preload the brake segments 6.1, 6.2 and 6.3 rotating in opposite directions to each other into the respective locking positions accordingly (i.e. one brake segment in one direction of rotation and a pair of brake segments in the other direction of rotation).

For releasing the locking of the pinion 7 provided via the brake assembly 2, the driver disc 11 already mentioned above is provided with its axially protruding driver projections 111, 112 and 113. Each of these driver projections 111, 112 and 113 engages in an assigned recess 6.10, 6.20 or 6.30 of a brake segment 6.1, 6.2 or 6.3, which is formed radially outwardly on a respective brake segment 6.1, 6.2 or 6.3. Each driver projection 111, 112 and 113 is thus located within a recess 6.10, 6.20 or 6.30 between two circumferentially opposite portions 6.10*a*/6.10*b*, 6.20*a*/6.20*b* or 6.30*a*/6.30*b* of the respective brake segment 6.1, 6.2 and 6.3. In this case, a distance of a respective driver projection 111, 112 or 113 to one of these two portions is smaller, so that contacting of the respective portion is possible in the respective direction of rotation cw or ccw.

For example, the driver projections 111 and 112 are each at a shorter distance from a contact portion 6.10*a* or 6.20*a* of the first or second brake segment 6.1 and 6.2 lying in the second direction of rotation ccw. The distance to an opposite portion 6.10*b* or 6.20*b* of the respective recess 6.10 or 6.20 is consequently larger, in particular larger than a distance which the driver projection 113 for the third brake segment has to a contact portion 6.30*a* of the third brake segment 6.3 lying in the first direction of rotation cw. If the driver disc 11 is rotated via the control disc 10 in the first direction of rotation cw, this (third) driver projection 113 acts on the third brake segment 6.3 via the contact 6.30*a* without the other driver projections 111, 112 acting on the brake segments 6.1 and 6.2 assigned to them. The rotation of the driver disc 11 in the first direction of rotation cw tilts the first brake segment 6.3 from its locking position into a release position and releases the locking of the pinion 7. The fact that the driver projections 111, 112 are not in contact with the opposite portions 6.10*b* and 6.20*b* of the first and second brake segments 6.1 and 6.2 assigned to them is irrelevant here. In the first (drive) direction of rotation cw, no locking of the pinion 7 is provided via the first and second brake segments 6.1, 6.2.

If, on the other hand, the driver disc 11 is rotated about the axis of rotation M in the opposite, second (drive) direction of rotation ccw under an applied drive torque, the (first and second) driver projections 111 and 112 come into contact with the contact portions 6.10*a* and 6.20*a* of the first and second brake segments 6.1 and 6.2 assigned to them. This allows the brake segments 6.1 and 6.2 to be tilted from their respective locking position into a release position. A locking of the pinion 7 for a rotation along the second (drive) direction of rotation ccw is thus released and the pinion 7 can be rotated by the control disc 10 about the axis of rotation M.

In the event of a drive torque introduced on the drive side in the first (drive) direction of rotation cw, the third brake segment 6.3 tilts against the stronger compression spring 4 by a defined idle travel (until the assigned driver projection 113 rests against the contact portion 6.30*a* of the third brake segment 6.3) and compresses the compression spring 4. The self-locking blocking effect defined via the contact points between the third brake segment 6.3 and the brake housing 3 is consequently cancelled and the pinion 7 can be actuated rotationally in the direction of rotation cw. With the drive torque acting in the opposite (drive) direction of rotation ccw, the first and second brake segments 6.1 and 6.3 in turn tilt by a defined idle travel against the two compression springs 4 and 5 and compress them. Here too, the self-locking blocking effect between the brake segments 6.1 and 6.2 and the brake housing 3 is thus cancelled. Since the counter-rotating third brake segment 6.3 does not develop a blocking effect in this direction of rotation ccw, the pinion 7 can then be actuated rotationally in the direction of rotation ccw.

FIGS. 3 to 6 show a further variant of a proposed adjustment device V, in which an asymmetrical braking effect is provided by the brake assembly 2 according to an identical principle. Instead of the brake segments 6.1, 6.2 and 6.3 provided in the variant of FIGS. 1 to 2A, rotationally symmetrical clamping bodies are provided in the variant of FIGS. 3 to 6, here in the form of brake rollers 6.1', 6.2' and 6.3'. Here, several sets of three brake rollers each are provided distributed circumferentially around a coupling portion 71 of the pinion 7. The brake rollers 6.1', 6.2' and 6.3' are accommodated here in an annular gap g between the coupling portion 71 and the brake surface 30 of the brake housing 3 in order to act in a clamping manner in a respective locking position and thus to lock the pinion 7.

Figure 4A:
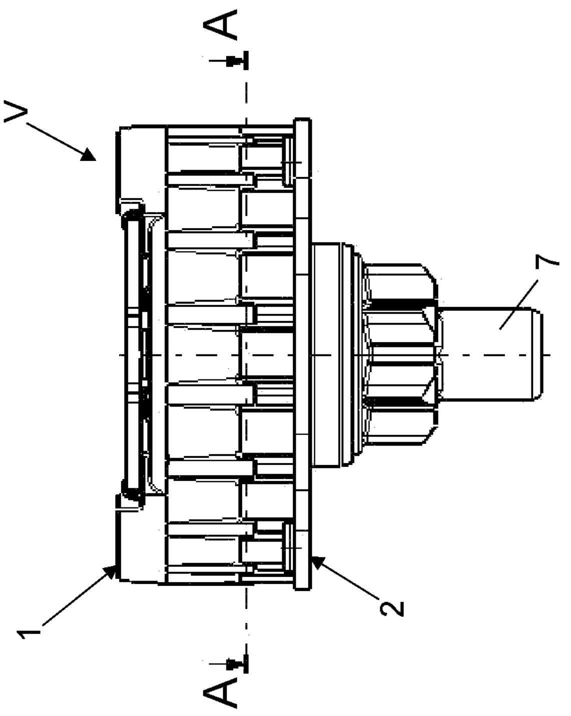
FIG. 4A shows the adjustment device from FIG. 3 in a side view in the assembled state.
Figure 3:
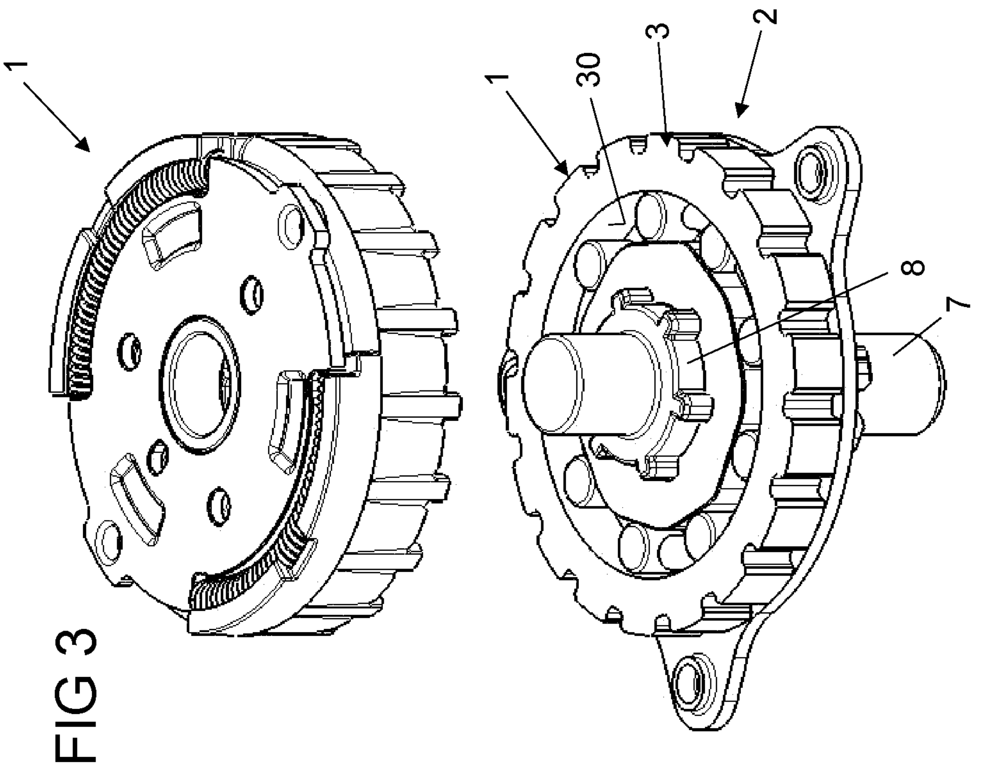
FIG. 3 shows, in a perspective view, a second variant of a proposed adjustment device with separate drive and brake assemblies.

FIG. 3 first shows here, in a partially exploded view, the adjustment device V with the brake assembly 2 integrating an asymmetrically acting roller brake. The drive assembly 1 is shown disassembled from the brake assembly 2. FIG. 4A shows the assembled state of the adjustment device V in a side view.

Figure 4B:
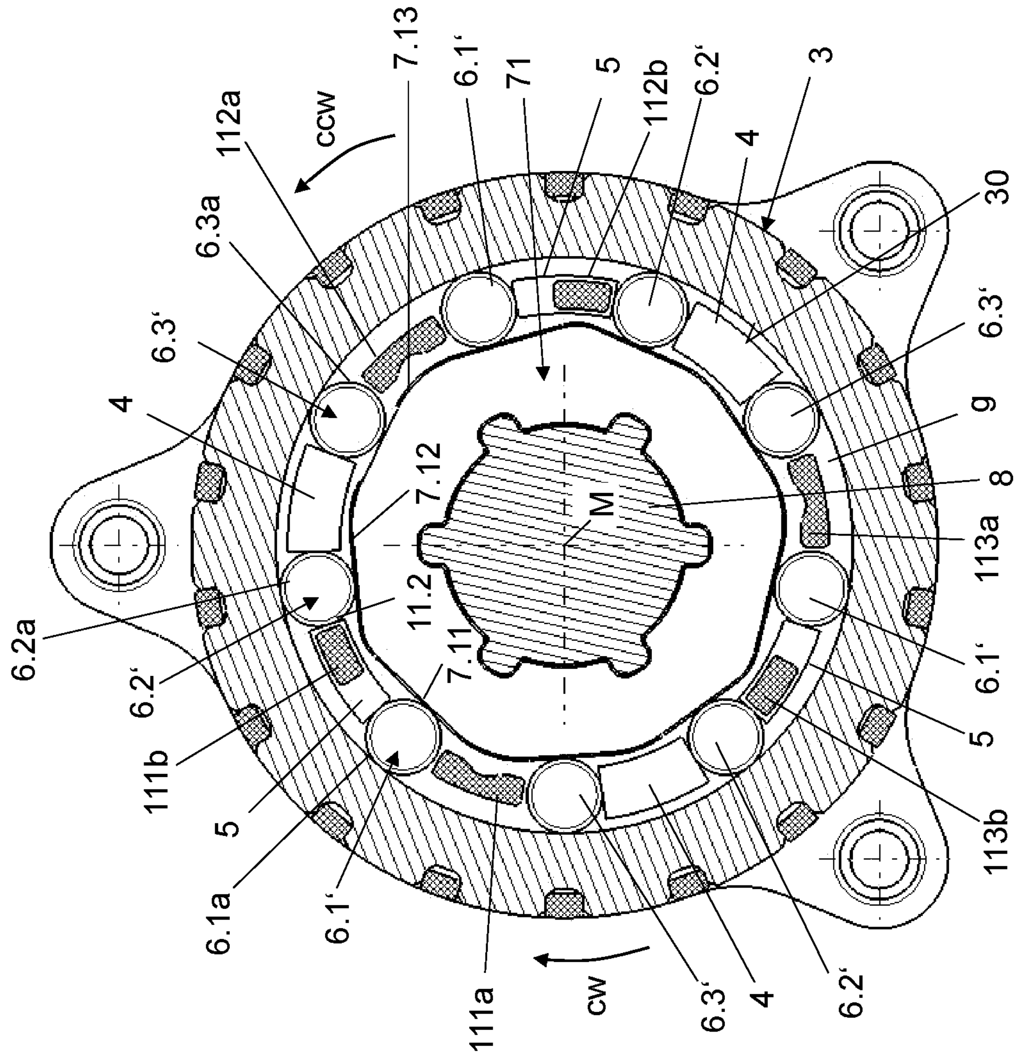
FIG. 4B shows a sectional view of the adjustment device along the line of section A-A from FIG. 4A showing several sets of three brake rollers each, which are arranged circumferentially in a gap within the brake assembly and are preloaded against each other via spring elements with different spring constants.

FIG. 4B shows a sectional view of the brake assembly 2 along the line of section A-A of FIG. 4A. In particular, it can be seen from this that in the present variant a first brake roller 6.1' and a second brake roller 6.2' are always preloaded against each other via a weaker spring 5 (with a smaller spring constant), while the second brake roller 6.2' is always preloaded against a third brake roller 6.3' via a stronger spring 4. Analogously to the previously described variant of FIGS. 1 to 2A, two brake elements—here in the form of the first and second brake rollers 6.1' and 6.2'—are thus preloaded against each other in pairs via an intermediate weaker spring element 5 and are thus jointly provided for locking the pinion 7 in a direction of rotation ccw (in this case in the counter-clockwise direction). A third brake element in the form of the brake roller 6.3', which is preloaded against the second brake roller 6.2' via the stronger spring 4, in turn takes over the locking of the pinion 7 in the opposite direction of rotation cw (in this case in the clockwise direction).

The first and second brake rollers 6.1', 6.2' are thus—similarly to the brake segments 6.1 and 6.2 of the variant of FIGS. 1 to 2A—part of a second group of brake elements of the brake assembly 2, which bear frictionally against the brake surface 30 when forces act on the pinion 7 on the drive side to rotate the pinion 7 in a (second) direction of rotation cw (ccw in the variant of FIGS. 1 to 2A), and to block the pinion 7 against such rotation. The brake rollers 6.3' are furthermore—analogously to the third brake segment 6.3—part of a first group of brake elements of the brake assembly 2, the brake portions of which bear frictionally against the brake surface 30 when output-side forces act on the pinion 7 to rotate the pinion 7 in an opposite (first) direction of rotation ccw, and to block the pinion 7 against a corresponding rotation.

In the variant of FIGS. 3 to 6, three sets of first, second and third brake rollers 6.1', 6.2' and 6.3' respectively are arranged around the circumference of the coupling portion 71 in the annular gap g in order to be able to apply braking forces to the drive pinion 7 that act in a manner distributed evenly over the circumference. An axially protruding driver projection 111*a*, 112*a* or 113*a* of a driver disc 11 engages in a respective gap between two sets of brake rollers. Furthermore, between each of the first and second brake rollers 6.1' and 6.2', an additional driver projection 111*b*, 112*b* or 113*b* is provided. This additional driver projection 111*b*, 112*b* or 113*b* is configured to be shortened in the axial direction compared to the other driver bar 111*a*, 112*a* or 113*a*, so that the additional, shortened driver projection 111*b*, 112*b* or 113*b* does not collide with the spring 5 present between the first and second brake rollers 6.1' and 6.2'.

Figure 5:
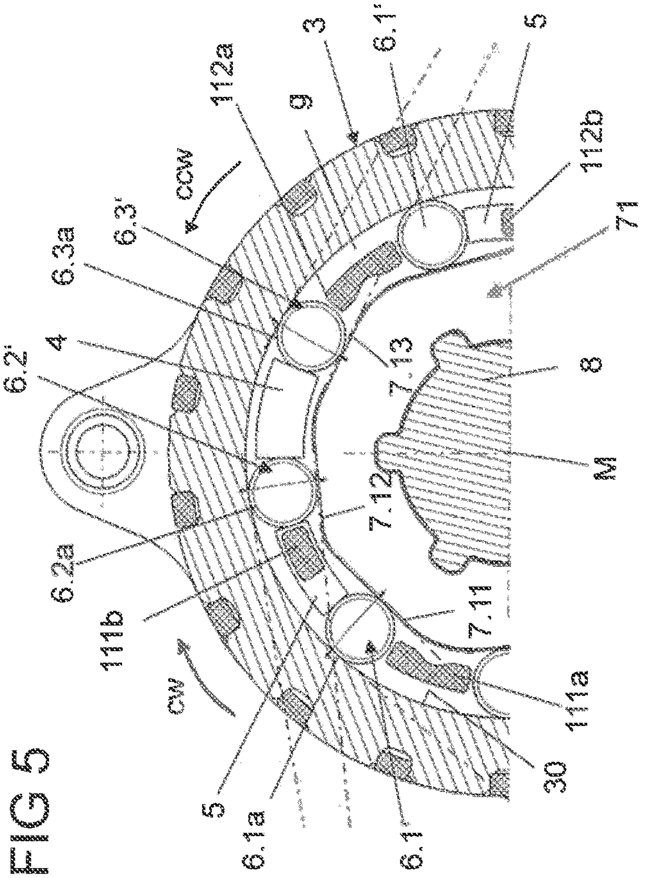
FIG. 5 shows an enlarged detail of the sectional view of FIG. 4B.

As can also be seen from the enlarged sectional view of a detail in FIG. 5, the brake rollers 6.1', 6.2' and 6.3' are in a respective locking position via the transfer contour of the—here cross-sectionally nonagonal—coupling portion 71 of the pinion 7 at the contact surfaces 7.11, 7.12 and 7.13 assigned to them, respectively, into which position the brake rollers 6.1', 6.2' and 6.3' are preloaded via the springs 4 and 5. In these locking positions, the brake rollers 6.1', 6.2' and 6.3' are each present between the coupling portion 71 and the brake surface 30 in a clamping manner in only one of the two possible directions of rotation cw, ccw. For example, the annular gap g tapers locally in the region of the contact surfaces 7.11, 7.12 assigned to the first and second brake rollers 6.1' and 6.2' in the second direction of rotation ccw (counter-clockwise). By contrast, the annular gap g tapers locally in the first direction of rotation cw (clockwise) via the transfer contour of the contact surface 7.13 for the third brake rollers 6.3'. Via the stronger spring 4, the first and second brake rollers 6.1' and 6.2' are thus preloaded into a locking position in the second direction of rotation ccw, while the third brake rollers 6.3' are each preloaded into a locking position in the opposite, first direction of rotation cw. Accordingly, the first and second brake rollers 6.1', 6.2' are in clamping contact with the brake surface 30 and the respective assigned contact surface 7.11, 7.12 with their outer circumferential surfaces acting as brake portions 6.1*a* and 6.2*a*, in order to lock the pinion 7 when a force is introduced into the pinion 7 on the output side and acts in the first direction of rotation cw. By contrast, the outer surface of the third brake rollers 6.3', which acts as a brake portion 6.3*a*, bears frictionally against the radially outer brake surface 30 and the respective assigned, radially inner contact surface 7.13 of the pinion 7 in order to counteract a rotation of the pinion 7 in the event of a force acting in the second direction of rotation ccw (counter-clockwise) on the output side.

Also in the brake assembly 2 of FIGS. 3 to 6, for example, the number of brake portions 6.1*a*, 6.2*a* acting in a braking and thus locking manner in the main load direction and the number of brake elements 6.1', 6.2' acting in a locking manner is, in total, twice as large as the number of brake portions 6.3*a* and assigned brake elements 6.3' provided for locking in the opposite direction of rotation. This makes it possible to considerably reduce the loads acting on the respective surfaces of the brake elements, via which they can slide along the brake housing 3, and thus the wear, depending on the direction of loading. This is also accompanied by the possibility of using more favorable materials for the smaller brake elements and a resultant increased performance.

Incidentally, an improved natural oscillation behavior can also be observed in the variant of FIGS. 3 to 6 due to the different strength of the springs 4 and 5. For example, a first brake roller 6.1' works better in a different frequency band than a second brake roller 6.2', and vice versa. Consequently, the roller brake provided via the brake assembly 2 is also less susceptible in total to an independent adjustment under frequency excitation.

Figure 6:
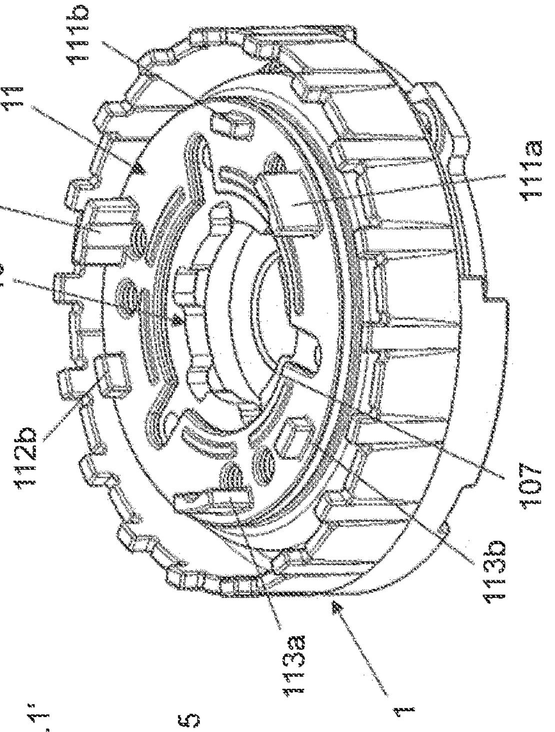
FIG. 6 shows the drive assembly of the adjustment device from FIG. 3, looking at a driver element for actuating the brake assembly.

The driver disc 11 provided for releasing a locking at the brake assembly 2 is illustrated again in greater detail in FIG. 6. The driver disc 11 is also connected here, for example via several pin connections, to a control disc 10 for conjoint rotation. This control disc 10 again has a pinion opening 107, in which a coupling element in the form of a coupling ring 8, which is connected for conjoint rotation to the pinion 7, engages form-fittingly. For this purpose, the coupling ring 8 has several radially protruding extensions which engage form-fittingly in assigned recesses of the pinion opening 107. In this way, a rotational movement of the control disc 10 is converted into a rotational movement of the coupling ring 8 and thus a rotational movement of the pinion 7 when a drive torque acts on the control disc 10 on the drive side. In this case, the driver disc 10 is then also entrained in the respective drive direction of rotation cw or ccw, acting on the different brake rollers 6.1', 6.2' and 6.3' via its different driver projections 111*a/b*, 112*a/b* and 113*a/b* (depending on the direction of rotation) in order to release the locking of the pinion 7.

Here, the driver portions 111*a*, 111*b*, 112*a*, 112*b*, 113*a* and 113*b* act in each case on the first and second brake rollers 6.1' and 6.2' of a brake roller pair to release a locking of the pinion 7 when a drive torque is to be transferred in the first (drive) direction of rotation cw. This displaces the first and second brake rollers 6.1', 6.2' relative to the coupling portion 71 of the pinion 7 against the preload forces applied by the springs 4 and 5, so that the first and second brake rollers 6.1', 6.2' are no longer in clamping contact with the brake housing 3 and the coupling portion 71.

By contrast, with an oppositely acting drive torque in the (drive) direction of rotation ccw, only the (first) driver projections 111*a*, 112*a* and 113*a* of the driver disc 11 act on the third brake rollers 6.3' in this direction of rotation ccw against the preload force of the stronger spring 4. This displaces the third brake rollers 6.3' in the direction of rotation ccw relative to the coupling portion 71 of the pinion 7, so that the third brake rollers 6.3' are no longer in clamping contact with the brake housing 3.

LIST OF REFERENCE CHARACTERS

1 drive assembly
10 control disc (control element)
107 pinion opening (form-fit opening)
11 driver disc (driver element)
111, 112, 113, driver protrusion (driver portion)
111*a/b*, 112*a/b*, 113*a/b*
2 brake assembly
3 brake housing
30 brake surface
4 (stronger) spring
5 (weaker) spring
6.1, 6.2, 6.3 brake segment (brake element)
6.1', 6.2', 6.3' brake roller (brake element)
6.10, 6.20, 6.30 recess
6.10*a*, 6.20*a*, 6.30*a* contact portion
6.10*b*, 6.20*b*, 6.30*b* opposite portion
6.11, 6.21, 6.31 contact portion
6.12, 6.22, 6.32 secondary portion
6.1*a*, 6.2*a*, 6.3*a* brake portion
7 pinion (output element)
71 coupling portion
7.11, 7.12, 7.13 contact surface
72 output portion
8 coupling ring (coupling element)
ccw second direction of rotation
cw first direction of rotation
g annular gap
M center axis/axis of rotation
V adjustment device

The invention claimed is:

1. An adjustment device for a vehicle seat, comprising:
an output element,
a drive assembly for introducing a drive torque to be transferred to the output element into the adjustment device, and
a brake assembly for locking the output element and absorbing, via at least two brake elements adjustably mounted in a brake housing of the brake assembly, forces applied to the output element on the output side,
wherein, when a drive torque is introduced via the drive assembly, a locking, provided via the brake assembly, of the output element can be released and the output element can be rotated along a direction of rotation, and, in order to lock the output element, the brake elements are in a locking position, in which, when forces are applied on the output side via the output element and are acting along a direction of rotation, at least one of the brake elements bears frictionally against a brake surface of the brake housing,
wherein a maximum braking torque counteracting an adjustment of the output element is provided via the brake assembly, which braking torque varies in magnitude according to the direction of rotation along which a force acting on the output element on the output side acts,
wherein at least three brake elements are provided, each of which comprises at least one brake portion for frictional contact with the brake surface of the brake housing, and
wherein a first group of brake elements is provided, the brake portions of which bear frictionally against the brake surface when forces act on the output element on the output side in order to rotate the output element along a first direction of rotation, and a second group of brake elements is provided, the brake portions of which bear frictionally against the brake surface when forces act on the output element on the output side in order to rotate the output element along an opposite, second direction of rotation, wherein the second group comprises at least one brake element and/or at least one brake portion more than the first group.

2. The adjustment device according to claim 1, wherein a first maximum braking torque provided via the brake assembly and counteracting a rotation of the output element along a first direction of rotation is smaller than a second maximum braking torque provided via the brake assembly and counteracting a rotation of the output element along an opposite, second direction of rotation.

3. The adjustment device according to claim 1, wherein in the brake assembly, depending on the direction of rotation, different numbers and/or differently dimensioned brake portions of the brake elements bear frictionally against the brake surface.

4. The adjustment device according to claim 1, wherein both the brake elements of the first group and the brake elements of the second group can be displaced from a respective locking position into a release position via a driver element of the brake assembly that can be driven by the drive assembly, in order to release the locking of the output element provided via the brake assembly when a drive torque is introduced via the drive assembly.

5. The adjustment device according to claim 4, wherein the driver element comprises a plurality of driver portions, each of which is assigned to at least one brake element for releasing the respective locking mechanism provided via this.

6. The adjustment device according to claim 5, wherein a driver portion can each be brought into contact with a contact portion of the assigned brake element when a drive torque is introduced via the drive assembly, for the displacement of an assigned brake element into the respective release position.

7. The adjustment device according to claim 6, wherein the driver element is rotatable about an axis of rotation and a driver portion for a brake element of the first group can only be brought into contact with a contact portion lying in a first drive direction of rotation, while a driver portion for a brake element of the second group can only be brought into contact with a contact portion lying in an opposite, second drive direction of rotation.

8. The adjustment device according to claim 1, wherein the brake elements of the brake assembly are tiltably mounted within the brake housing between a respective locking position and a release position, in which a locking of the output element is released via the respective brake element.

9. The adjustment device according to claim 1, wherein the brake elements of the brake assembly can, in their respective locking position, each bear against an assigned contact surface of the output element via a convexly curved contact portion.

10. The adjustment device according to claim 1, wherein the brake assembly comprises exactly three brake elements and the output element has a hexagonal cross-section with three separate contact surfaces for the three brake elements.

11. An adjustment device for a vehicle seat, comprising:

an output element, a drive assembly for introducing a drive torque to be transferred to the output element into the adjustment device, and a brake assembly for locking the output element and absorbing, via at least two brake elements adjustably mounted in a brake housing of the brake assembly, forces applied to the output element on the output side, wherein, when a drive torque is introduced via the drive assembly, a locking, provided via the brake assembly, of the output element can be released and the output element can be rotated along a direction of rotation, and, in order to lock the output element, the brake elements are in a locking position, in which, when forces are applied on the output side via the output element and are acting along a direction of rotation, at least one of the brake elements bears frictionally against a brake surface of the brake housing, wherein a maximum braking torque counteracting an adjustment of the output element is provided via the brake assembly, which braking torque varies in magnitude according to the direction of rotation along which a force acting on the output element on the output side acts, and wherein the brake assembly comprises at least two spring elements, via which brake elements of the brake assembly are preloaded against each other, wherein the spring forces acting on the brake elements and applied by the spring elements are of different magnitudes.

12. An adjustment device for a vehicle seat, comprising:

an output element, a drive assembly for introducing a drive torque to be transferred to the output element into the adjustment device, and a brake assembly for locking the output element and absorbing, via at least two brake elements adjustably mounted in a brake housing of the brake assembly, forces applied to the output element on the output side, wherein, when a drive torque is introduced via the drive assembly, a locking, provided via the brake assembly, of the output element can be released and the output element can be rotated along a direction of rotation, and, in order to lock the output element, the brake elements are in a locking position, in which, when forces are applied on the output side via the output element and are acting along a direction of rotation, at least one of the brake elements bears frictionally against a brake surface of the brake housing, wherein a maximum braking torque counteracting an adjustment of the output element is provided via the brake assembly, which braking torque varies in magnitude according to the direction of rotation along which a force acting on the output element on the output side acts, wherein at least three brake elements are provided, each of which comprises at least one brake portion for frictional contact with the brake surface of the brake housing, and wherein the brake assembly comprises at least two spring elements with different spring constants, of which a first spring element with a first spring constant preloads a first brake element and a second brake element of the at least three brake elements against each other and a second spring element with a higher, second spring constant preloads a third brake element and the first brake element of the at least three brake elements against each other.

13. The adjustment device according to claim 1, wherein a control element is provided for transferring the drive torque introduced via the drive assembly into the output element, which control element is form-fittingly connected to a) a coupling portion of the output element or b) a coupling element of the adjustment device, which coupling element is connected to the output element in a rotationally fixed manner.

14. The adjustment device according to claim 4, wherein a control element is provided for transferring the drive torque introduced via the drive assembly into the output element, which control element is form-fittingly connected to a) a coupling portion of the output element or b) a coupling element of the adjustment device, which coupling element is connected to the output element in a rotationally fixed manner, wherein the control element is connected in a rotationally fixed manner to the driver element.

15. A vehicle seat, comprising an adjustment device according to claim 1 for seat height adjustment.

* * * * *